United States Patent
Mignard et al.

(10) Patent No.: US 6,306,286 B1
(45) Date of Patent: Oct. 23, 2001

(54) IM-5 PHOSPHORUS ZEOLITE, CATALYTIC COMPOSITION, ITS PREPARATION AND ITS USE IN CATALYTIC CRACKING

(75) Inventors: Samuel Mignard, Buxerolles (FR); Avelino Corma Canos, Valencia; Joaquin Martinez Triguero, Manises-Valencia, both of (ES); Eric Benazzi, Chatou (FR); Sylvie Lacombe, Rueil Malmaison (FR); Gil Mabilon, Carrieres sur Seine (FR)

(73) Assignee: Institut Francais du Petrole, Rueil/Malmaison Cedex (FR)

( * ) Notice: Subject to any disclaimer, the term of this patent is extended or adjusted under 35 U.S.C. 154(b) by 0 days.

(21) Appl. No.: 09/569,303

(22) Filed: May 11, 2000

(30) Foreign Application Priority Data

May 11, 1999 (FR) .................................................. 99 06189

(51) Int. Cl.[7] .............................. C01G 11/05; B01J 29/06
(52) U.S. Cl. ................ 208/114; 208/120.01; 208/120.1; 208/120.35; 502/60; 502/64
(58) Field of Search ...................... 502/60, 64; 208/114, 208/120.01, 120.1, 120.35

(56) References Cited

U.S. PATENT DOCUMENTS

| | | | |
|---|---|---|---|
| 5,968,475 | * 10/1999 | Benazzi et al. | 423/713 |
| 5,989,410 | * 11/1999 | Benazzi et al. | 208/134 |
| 6,007,698 | * 12/1999 | Benazzi et al. | 208/120.01 |
| 6,136,290 | * 10/2000 | Benazzi et al. | 423/705 |

\* cited by examiner

*Primary Examiner*—Steven P. Griffin
*Assistant Examiner*—Christina Ildebrando
(74) *Attorney, Agent, or Firm*—Millen, White, Zelano & Branigan, P.C.

(57) ABSTRACT

An IM-5 zeolite that is modified by adding phosphorus that is optionally dealuminified, preferably in aluminosilicic form, and that contains at most 10% by weight of phosphorus, a composition that contains it, its processes for preparation and its application to catalytic cracking of hydrocarbon feedstocks are described.

22 Claims, No Drawings

IM-5 PHOSPHORUS ZEOLITE, CATALYTIC COMPOSITION, ITS PREPARATION AND ITS USE IN CATALYTIC CRACKING

This invention relates to a zeolite that is referred to as IM-5 and that is modified by adding phosphorus, from which optionally some metal Ti, B, Fe, Ga or Al has been removed, a catalytic composition that contains it, its preparation and its use in particular in a catalytic cracking process of a hydrocarbon feedstock. More specifically, it relates to an aluminosilicate molecular sieve that is stabilized by at least one phosphorus compound.

The prior art is illustrated by the patent U.S. Pat. No. 5,110,776 that describes a treatment with REY zeolite phosphate.

The molecular sieves of zeolitic nature are crystalline materials that comprise a three-dimensional network of tetrahedrons $TO_4$ with T equal to Si, Al, B, P, Ge, Ti, Ga, Fe, for example. This network defines an intracrystalline microporous network with dimensions that are comparable to those of small to medium-sized organic molecules. The microporous network can be a system of channels and/or cavities, shaped by the crystalline network, which can be identified by its particular and specific X-ray diffraction diagram.

The potential applications of a zeolite (for example, in the processes of catalysis, adsorption, cationic exchange and purification) depend mainly on the size, the shape and characteristics (monodimensional, multidimensional) of its microporous network and its chemical composition. For example, in the zeolites of aluminosilicate type, the presence of $AlO_4^-$ tetrahedrons that are isolated in an $SiO_4$ tetrahedron matrix requires the presence of compensation cations to counterbalance the negative charge of the network. Typically, these cations have great mobility and can be exchanged by others, for example $H^+$ or $NH_4^+$, whereby the latter can be transformed into $H^+$ via calcination, which results in an acidic microporous solid. The zeolite is then in its acid form, still called hydrogen form. When all of the compensation cations are organic alkylammonium or ammonium cations, the calcination results right in the acid form of the zeolite. These microporous acidic solids can be used in the processes of acid catalysis, and their activity and selectivity depend both on the force of the acid, the density of the acid sites, the dimensional characteristics of the space that is delimited in the network where the acid sites are located.

The size of the channels can be described by the number of $TO_4$ tetrahedrons that are present in the ring that delimits the openings of pores, element that monitors the diffusion of molecules. Thus, the channels are classified in categories: the small pores (openings of annular pores delimited by a scheme of 8 $TO_4$ tetrahedrons (8 MR), medium-sized pores (10 MR) and large pores (12 MR), whereby MR means membered ring in English.

This structural characteristic can obtain advantageous properties of shape selectivity with these materials in heterogenous catalysis. The term shape selectivity is generally used to explain specific catalytic selectivities that are due to steric constraints that exist inside the zeolitic microporous system. These constraints can act on the reagents (diffusion of reagents in the zeolite), on the products of the reaction (formation and diffusion of products that are formed outside of the zeolite) on the reaction intermediate products or on the reaction transition states that are formed in the micropores of the zeolite during the reactions. The presence of suitable steric constraints makes it possible in some cases to avoid the formation of transition states and reaction intermediate products that result in the formation of undesirable products and improves the selectivities in some cases.

The object of the invention relates to the IM-5 zeolite, optionally partially lacking in metal T, containing phosphorus and its use when it is partly dealuminified in catalytic cracking, by itself or mixed with a conventional catalytic cracking catalyst. The catalyst of this invention is particularly well suited for cracking of petroleum fractions for the purpose of producing a large amount of compounds that have 3 and/or 4 carbon atoms per molecule and more particularly propylene and butenes. The catalyst of this invention is particularly well suited to cracking of heavy petroleum fractions.

This invention also relates to the process of cracking of heavy petroleum feedstocks, in the presence of the catalyst that is defined above, as well as the processes for preparation of said catalyst. The cracking of hydrocarbon feedstocks that make it possible to obtain high gasoline outputs for an automobile of very good quality was imposed in the petroleum industry from the end of the 1930's. The introduction of the processes that operate in a fluid bed (FCC or Fluid Catalytic Cracking) or in a moving bed (such as the TCC), in which the catalyst permanently circulates between the reaction zone and the regenerator where coke is removed from it by combustion in the presence of a gas that contains oxygen, introduced significant progress relative to the technique of the fixed bed.

From the beginning of the 1960's, the most used catalysts in the cracking units have been zeolites that usually have a faujasite structure (FAU). These zeolites, incorporated in an amorphous matrix, for example that consists of amorphous silica-alumina and can contain variable proportions of clays, are characterized by cracking activities, relative to hydrocarbons, 1,000 to 10,000 times greater than those of the silica-alumina catalysts that are high in silica and that were used up until the late 1950's.

Toward the end of the 1970's, the lack of available crude oil and the growing demand for gasoline with a high octane rating led refiners to treat heavier and heavier crudes. The treatment of the latter constitutes a difficult problem for the refiner due to their high content of catalytic poisons, in particular in metal compounds (in particular nickel and vanadium), unusual values of Conradson carbon and primarily asphaltene compounds.

This necessity of treating heavy feedstocks and other more recent problems, such as the progressive but general elimination in the gasoline of lead-based additives, the slow but appreciable evolution in some countries of the demand for middle distillates (kerosenes and gas oils) have, moreover, prompted refiners to seek improved catalysts that make it possible to reach in particular the following goals:

better thermal and hydrothermal stability and better tolerance in metals, lower production of coke with identical conversion, better octane rating of the gasoline, improved selectivity of middle distillates.

In the majority of cases, an effort is made to minimize the production of light gases that comprise compounds that have 1 to 4 carbon atoms per molecule and, consequently, the catalysts are designed to limit the production of such light gases.

In some special cases, however, there appears a significant demand for light hydrocarbons of 2 to 4 carbon atoms per molecule or in some of them, such as the hydrocarbons of C3 and/or C4 and more particularly propylene and butenes.

Obtaining a large amount of butenes is in particular advantageous in the case where the refiner uses an alkylation unit, for example C3–C4 fractions that contain olefins, to form an additional amount of gasoline with a high octane rating. Thus, the overall yield of good-quality gasoline that is obtained from the starting hydrocarbon fractions is appreciably increased.

Obtaining propylene is particularly desired in some less developed countries where there is a significant demand for this product.

To a certain extent, the catalytic cracking process can satisfy such demands provided that in particular the catalyst is adapted for the purpose of this production. An effective manner of adapting the catalyst consists in adding to the catalytic masses an active agent that exhibits the following two qualities:

cracking the heavy molecules with a good selectivity of hydrocarbons with 3 and/or 4 carbon atoms, in particular propylene and butenes;

being adequately resistant to severe conditions of partial pressure of water vapor and temperature that prevail in an industrial cracker regenerator.

The research work that is carried out by the applicant on numerous zeolites led him to discover that, in a surprising way, the zeolite that is referred to as IM-5 and that is modified by adding the phosphorus that is referred to as IM5-P made it possible to obtain a catalyst that has excellent activity and that has good selectivity relative to a hydrocarbon production with 3 and/or 4 carbon atoms per molecule. The use of such a zeolite according to the invention makes it possible to obtain a cracking catalyst that results in obtaining a larger proportion of gas, in particular propylene and butenes.

The phosphorus content of the IM5-P zeolite is generally at most equal to 10% by weight, advantageously at most equal to 5%, expressed by weight, for example between 2 and 4%.

The invention also relates to the process for preparation of the IM-5 zeolite that is modified by adding phosphorus.

The phosphorus can be added at various times: in the presence of a structuring agent, right during synthesis, in solution, under various chemical forms: phosphoric acids, phosphates, organophosphates, phosphorus chlorides. More specifically, according to a first variant, the IM5-P zeolite is prepared by bringing into contact at least one nitrogen-containing organic cation, at least one silicon or germanium oxide, at least one metal oxide T that is selected from the group that is formed by Al, Fe, Ga, Ti and B and at least one compound of phosphorus and optionally one oxide of an alkali metal M and/or ammonium, or their precursors, whereby the mixture generally has the following molar composition:

$XO_2/T_2O_3$ at least 10, $(R_{1/n})OH/XO_2$ of 0.01 to 2

$H_2O/XO_2$ of 1 to 500

$Q/XO_2$ of 0.005 to 1

$L_qZO2$ of 0 to 5 where X is silicon and/or germanium,

T is selected from the group that is formed by the following elements: aluminum, iron, gallium, titanium and boron, R is a cation of valence n that comprises M (a alkali metal and/or ammonium cation) and/or Q (a nitrogen-containing organic cation or a precursor of the latter or a decomposition product of the latter), and LqZ is a salt, whereby Z is an anion of valence q and L is an ion of alkali metal and/or ammonium that can be similar to M or a mixture of M and another alkali metal ion or an ammonium ion that is necessary for balancing anion Z, whereby Z can comprise an acid radical that is added, for example, in the form of a salt of L or an aluminum salt.

X preferably can be silicon, and Y can be aluminum.

According to a second preferred variant, it is possible to impregnate, under adequate conditions, the optionally calcined IM-5 zeolite with an aqueous solution of at least one acid that is selected from the group that is formed by $H_3PO_3$, $(NH_4)_3PO_4$, $(NH_4)_2HPO_4$, $(NH_4)H_2PO_4$, or one of its salts. The product that is obtained is generally calcined at a temperature of 350 to 1000° C. for a period depending on the calcination temperature used and can vary from 0.1 second to 10 hours, for example.

These two implementations are particularly advantageous since the absence of alkali ions presents at least one ionic exchange stage by an ammonium ion solution, for example, and a calcination stage to obtain the acid form.

The IM5-P zeolite that is at least partly in hydrogen form according to this invention has a structure that has not yet been clarified but that is identical to that of the IM5 zeolite without phosphorus that is described in French Patent Application FR-2,754,809.

The IM-5-P zeolite, in crude synthesis form, is characterized by the fact that it has an X-diffraction diagram that comprises the lines that are exhibited in Table 1.

The IM-5-P zeolite in its hydrogen form, referred to as H-IM-5-P, is obtained by calcination(s) and exhibits a diffraction diagram of the x-rays comprising the lines that are exhibited in Table 2.

TABLE 1

Table of diffractions of the x-rays of the IM-5-P zeolite

| $d_{hkl}$ (Å) | $I/I_{max}$ |
|---|---|
| 11.8 ± 0.35 | F to TF(1) |
| 11.5 ± 0.30 | F to TF(1) |
| 11.25 ± 0.30 | F to TF(1) |
| 9.95 ± 0.20 | m to F |
| 9.50 ± 0.15 | m to F |
| 7.08 ± 0.12 | f to m |
| 6.04 ± 0.10 | tf to f |
| 5.75 ± 0.10 | f |
| 5.65 ± 0.10 | f |
| 5.50 ± 0.10 | tf |
| 5.35 ± 0.10 | tf |
| 5.03 ± 0.09 | tf |
| 4.72 ± 0.08 | f to m |
| 4.55 ± 0.07 | f |
| 4.26 ± 0.07 | tf |
| 3.92 ± 0.07 | F to TF (2) |
| 3.94 ± 0.07 | TF (2) |
| 3.85 ± 0.05 | TF (2) |
| 3.78 ± 0.04 | F to TF (2) |
| 3.67 ± 0.04 | m to F |
| 3.55 ± 0.03 | m to F |
| 3.37 ± 0.02 | f |
| 3.30 ± 0.015 | f |
| 3.099 ± 0.012 | f to m |
| 2.970 ± 0.007 | tf to f |
| 2.815 ± 0.005 | tf |
| 2.720 ± 0.005 | tf |

(1)Lines that are part of the same solid mass,
(2) Lines that are part of the same solid mass.

TABLE 2

Table of diffraction of the x-rays of the H-IM-5-P zeolite

| $d_{hkl}$ (Å) | $I/I_{max}$ |
|---|---|
| 11.8 ± 0.30 | F to TF(1) |
| 11.45 ± 0.25 | TF(1) |
| 11.20 ± 0.20 | F to TF(1) |
| 9.90 ± 0.15 | m to F |
| 9.50 ± 0.15 | m to F |
| 7.06 ± 0.12 | f to m |
| 6.01 ± 0.10 | tf to f |
| 5.70 ± 0.10 | f |
| 5.30 ± 0.10 | tf |
| 5.03 ± 0.09 | tf |
| 4.71 ± 0.08 | f |
| 4.25 ± 0.07 | tf |
| 3.87 ± 0.07 | m to F (2) |
| 3.81 ± 0.05 | m to F (2) |
| 3.76 ± 0.04 | m to F (2) |
| 3.67 ± 0.04 | f to m |
| 3.54 ± 0.04 | m to F |
| 3.37 ± 0.03 | f |
| 3.316 ± 0.015 | f |
| 3.103 ± 0.012 | f |
| 3.080 ± 0.010 | f to m |
| 2.950 ± 0.010 | tf to f |
| 2.880 ± 0.007 | tf |
| 2.790 ± 0.005 | tf |
| 2.590 ± 0.005 | tf |

(1) Lines that are part of the same solid mass,
(2) Lines that are part of the same solid mass.

These diagrams are obtained with a diffractometer by using the standard method of powders with radiation Kα of copper. Starting from the positions of diffraction peaks shown by angle 2θ, characteristic reticular equidistances dhkl of the sample are calculated by Bragg's equation. The calculation of the intensity is carried out on the basis of an intensity scale relative to which a value of 100 is attributed to the line that exhibits the strongest intensity on the X-diffraction diagram:

very weak (tf) means less than 10,
weak (f) means less than 20
medium (m) means between 20 and 40,
strong (F) means between 40 and 60,
very strong (TF) means greater than 60.

The X diffractograms from which these data were obtained (spacing d and relative intensities) are characterized by broad reflections with numerous peaks that form shoulders on other peaks of higher intensity. It may happen that some shoulders, or all of the shoulders, are not resolved. This can occur for slightly crystalline samples or samples within which the crystals are small enough to provide a significant broadening of the x rays. This can also be the case when the equipment or the implementation conditions for obtaining the diagram differ from those that are used here.

The IM-5 zeolite, in hydrogen form and referred to by H-IM-5 and obtained by calcination and/or ionic exchanges of the crude synthesis IM-5 zeolite, used in the process according to the invention as well as its synthesis method, are described in Patent Application FR-2 754 809.

The zeolitic structure, named IM-5, has a chemical composition that is expressed on an anhydrous basis in terms of molar oxide ratios, by the formula:

100 $XO_2$, $mT_2O_3$, p $R_{2/n}O$, where m is equal to or less than 10,
p is between 0 (exclusive) and 20,
R represents one or more cations of valence n,
X is silicon and/or germanium, preferably silicon,
T is selected from the group that is formed by the following elements: aluminum, iron, gallium, boron, titanium, preferably T is aluminum.

The IM-5-P zeolitic structure according to the invention has approximately the same chemical composition.

The IM-5-P zeolite exhibits an Si/T atomic ratio of between 5 and 600 and in particular between 10 and 300.

The overall Si/T ratio of the zeolite as well as the chemical composition of the samples are determined by X fluorescence and atomic adsorption.

The IM-5-P zeolite according to the invention can be obtained with the desired Si/T ratio, for the catalytic application according to the invention, right in the synthesis by adjusting the synthesis operating conditions. Then, the zeolite is calcined and exchanged by at least one treatment by a solution of at least one ammonium salt to obtain the ammonium form of the zeolite that, once calcined, results in the hydrogen form of the zeolite.

Furthermore, certain catalytic applications require an adjustment of the thermal stability and the acidity of the zeolite in the reaction in question. One of the means for optimizing the acidity of a zeolite is to reduce the amount of metal T that is present in its skeleton. The Si/T ratio of the skeleton can be adjusted during synthesis or else after synthesis. In the latter case, the so-called operation for eliminating metal should be carried out in particular by destroying the crystalline structure of the zeolite as little as possible. It thus is possible to use a zeolite whose Si/T atomic ratio can be between 5 and 600 and whose acidity can be monitored.

It is known to one skilled in the art that a partial dealuminification of the skeleton of the zeolite and more generally the partial elimination of metal T leads to a more thermally stable solid. The dealuminification treatments that the zeolites undergo, however, lead to the forming of extra-skeleton aluminum radicals that can clog the micropores of the zeolite if they are not eliminated. This is the case, for example, of zeolites that are used as additives to the catalytic cracking catalyst in the FCC units for the production of olefins. Actually, in the regenerator of the cracking unit, high temperatures that are greater than 600° C. and a significant water vapor pressure prevail that will lead to a dealuminification of the skeleton of the zeolites and consequently to a loss of acid sites and to clogging of the micropores. These two phenomena combine to reduce the activity and thus the effectiveness of the zeolitic additive.

In contrast, dealuminification that is monitored and carried out outside of the unit makes it possible to adjust the dealuminification rate of the skeleton of the zeolite exactly and also makes it possible to eliminate in particular the extra-skeleton aluminum radicals that clog the micropores contrary to what happens in the cracking unit, as was explained in the paragraph above. The stage for partially eliminating the metal and in particular post-synthesis dealuminification can be carried out by any technique that is known to one skilled in the art; it is possible to cite as nonlimiting examples any heat treatment, optionally in the presence of water vapor, followed by at least one acid attack by at least one solution of a mineral or organic acid, or else any dealuminification by at least one acid attack by at least one solution of a mineral or organic acid. This elimination of the metal leads to zeolites with IM-5-P phosphorus whose Si/T atomic ratio is greater than 5, advantageously greater than 10, preferably greater than 15, and more particularly between 20 and 400, which imparts both activity and resistance to the zeolite according to the invention.

According to a first variant of the stage for eliminating the metal, the first so-called direct acid attack method comprises a first calcination stage under a stream of dry air at a temperature that is generally between about 450 and 550° C., which has as its object to eliminate the organic structuring agent that is present in the micropores of the zeolite, followed by a stage for treatment by an aqueous solution of a mineral acid such as $HNO_3$ or HCl or an organic acid such as $CH_3COH$. This last stage can be repeated as often as necessary to obtain the desired dealuminification level. Between these two stages, it is possible to carry out one or more ionic exchanges by at least one $NH_4NO_3$ solution to eliminate at least in part, preferably virtually totally, the alkaline cation, in particular sodium. Likewise, at the end of the dealuminification treatment by direct acid attack, it is possible to carry out one or more ionic exchanges by at least one $NH_4NO_3$ solution to eliminate the residual alkaline cations and in particular sodium.

To achieve the desired Si/Al ratio, for example, it is necessary to select the operating conditions properly; from this viewpoint, the most critical parameters are the temperature of treatment by the acid aqueous solution, the concentration of the latter, its nature, the ratio between the amount of acid solution and the mass of treated zeolite, the length of treatment and the number of treatments carried out.

According to a second variant of the stage for eliminating metal, the second so-called heat treatment method (in particular with water vapor or "steaming") +acid attack comprises, in a first step, the calcination under a stream of dry air, at a temperature that is generally between about 450 and 550° C., which has as its object to eliminate the occluded organic structuring agent in the micropores of the zeolite. Then, the solid that is thus obtained is subjected to one or more ionic exchanges by at least an $NH_4NHO$ solution, so as to eliminate at least partly, preferably virtually totally, the alkaline cation, in particular sodium, present in cationic position in the zeolite. The zeolite that is thus obtained is subjected to at least one skeleton dealuminification cycle that comprises at least one heat treatment that is carried out optionally and preferably in the presence of water vapor at a temperature of generally between 500 and 900° C., and optionally followed by at least one acid attack by an aqueous solution of a mineral or organic acid. The calcination conditions in the presence of water vapor (temperature, water vapor pressure and length of treatment) as well as the post-calcination acid attack conditions (length of the attack, concentration of the acid, nature of the acid used, and the ratio between the acid volume and the zeolite mass) are adapted so as to obtain the desired dealuminification level. For the same purpose, it is also possible to manipulate the number of heat treatment-acid attack cycles that are carried out.

In the preferred case where T is Al, the dealuminification cycle of the skeleton that comprises at least one heat treatment stage and that is carried out optionally and preferably in the presence of water vapor and at least one attack stage in the acid medium of the IM-5 zeolite can be repeated as often as necessary to obtain the dealuminified IM-5 zeolite that has the desired characteristics. Likewise, following the heat treatment that is carried out optionally and preferably in the presence of water vapor, several successive acid attacks with acid solutions of different concentrations can be carried out.

A variant of this second calcination method can consist in carrying out the heat treatment of the IM-5-P zeolite that contains the organic structuring agent at a temperature of generally between 500 and 850° C., optionally and preferably in the presence of water vapor. In this case, the calcination stages of the organic structuring and dealuminification of the skeleton are carried out simultaneously. Then, the zeolite is optionally treated by at least one aqueous solution of a mineral acid (for example $HNO_3$ or HCl) or organic acid ($CH_3CO_2H$, for example). Finally, the solid that is thus obtained optionally can be subjected to at least one ionic exchange by at least one $NH_4NO_3$ solution to eliminate virtually any alkaline cation, in particular sodium, that is present in cationic position in the zeolite.

The IM-5-P zeolite according to the invention is at least partly, preferably virtually totally, in acid form, i.e., in hydrogen form (H'). The Na/T atomic ratio is generally less than 10% and preferably less than 5% and even more preferably less than 1%.

The invention also relates to a catalytic composition. It can comprise:

a) from 0 to 60%, for example 0.1 to 60%, preferably 4 to 50% and even more preferably 10 to 40% by weight of at least one zeolite other than the phosphorus zeolite according to the invention and preferably the Y zeolite with a faujasite structure, b) from 0.01 to 97%, preferably 0.05 to 40% and even more preferably 0.1 to 20% of at least one IM-5-P zeolite at least in part in hydrogen form that has the characteristics given above, and, c) at least 3% of at least one matrix, and preferably at least 20% and, for example, 40 to 70%.

According to a first variant, this composition can contain the zeolite according to the invention that is associated with at least one inorganic oxide matrix.

According to a second variant, this composition can comprise at least one IM-5-P zeolite, at least one matrix that was already mentioned, and at least one zeolite other than the IM-5-P zeolite.

For example, in the case of the use of the catalytic composition in catalytic cracking in a fluidized bed, this zeolite will be a cracking zeolite such as a Y zeolite that comprises the ultrastable Y zeolite (modified and stabilized with vapor), the X zeolite, the beta zeolite, the ZSM-5-type zeolites, the silicalites, and the LZ 210-type zeolites.

This usually amorphous or poorly crystallized matrix is selected from, for example, the group that is formed by alumina, silica-alumina, silica, magnesia, clay, titanium oxide, zirconia, the combinations of at least two of these compounds and the alumina-boron oxide combinations.

The matrix is preferably selected from the group that is formed by silica, alumina, magnesia, the silica-alumina mixtures, the silica-magnesia mixtures and the clays including kaolin and metakaolin.

The catalytic composition that is used in particular in catalytic cracking of hydrocarbon feedstocks can be prepared by all of the methods that are known to one skilled in the art.

The composition thus can be obtained by, for example, simultaneous incorporation of the IM-5 zeolite that is modified by the phosphorus, at least in part in hydrogen form, and the Y zeolite according to standard methods for preparing cracking catalysts that contain a zeolite. The IM5-P zeolite can be at least partly dealuminified or its metal T can be removed.

The composition can also be obtained by mechanical mixing of a first product that contains a matrix and another zeolite, a Y zeolite for example, and a second product that comprises the IM-5 zeolite that is modified by adding phosphorus, at least partly in hydrogen form and described above with a matrix that can be identical or different from the one that is contained in said first product. This mechanical mixture is usually carried out with dried products. The drying of the products is preferably carried out by spray-drying, for example at a temperature of 100 to 500° C., usually for 0.1 to 30 seconds.

After drying by spray-drying, these products can also contain about 1 to 30% by weight of volatile material (water and ammonia).

The catalytic composition that is thus prepared and used in cracking can contain:
 a) from 0 to 60%, for example 0.1 to 60%, preferably 4 to 50% and even more preferably 10 to 40% by weight of at least one zeolite other than the phosphorus zeolite according to the invention and preferably the Y zeolite with a faujasite structure,
 b) from 0.01 to 97%, preferably 0.05 to 40%, and even more preferably 0.1 to 20% of at least one IM-5-P zeolite that is at least partly in hydrogen form and that has the characteristics provided above, and
 c) at least 3% of at least one matrix and preferably at least 20% and, for example, 40 to 70%.

The general conditions of the catalytic cracking reactions are particularly well known to not be repeated here within the scope of this invention (see, for example, U.S. Pat. Nos. 3,293,192, 3,449,070, 4,415,438, 3,518,051 and 3,607,043).

To produce the largest possible amount of gaseous hydrocarbons with three and/or four carbon atoms per molecule, and in particular propylene and butenes, it is sometimes advantageous to increase the temperature slightly at which the cracking is carried out, for example from 10 to 50° C. The catalyst of this invention is, however, in the majority of cases, active enough so that such a temperature increase is not necessary. Under very strict conditions of use to maximize the production of propylene, the contact time may be high: about 10,000 to 60,00 milliseconds.

The catalytic cracking conditions can then be the following:
 contact time of between 10 and 60,000 milliseconds
 ratio by weight of catalyst to feedstock (C/O) of between 0.5 and 50
 reaction temperature 400° C. to 800° C.
 pressure 0.5 to 10 bar (1 bar=$10^5$ Pa).

The following examples illustrate this invention without, however, limiting its scope.

EXAMPLE 1

Preparation of the IM-5-P Zeolite—Cracking of N-decane:

The starting IM-5 sample was used in acid form and without a structuring agent. The preparation is done in five stages:
1. The zeolite in powder form is dispersed in an aqueous solution in a container that contains:
   water (deionized) with a ratio by weight of liquid/solid= 10 g/g
   X% by weight of phosphorus in the form of ammonium phosphate of chemical formula $NH_4H_2PO_4$, whereby X is the percentage of phosphorus in question. For example, for 1 g of zeolite:
   10 g of water
   0.0375*X g of $NH_4H_2PO_4$ (purity equal to 99%).
2. The well-dispersed mixture is placed in a rotary evaporator under a vacuum that is kept at a temperature of 80° C. The pressure is adjusted to prevent excessive boiling: the mixture should be dry at the end of approximately one hour.
3. Drying in a furnace at 100° C. for one night.
4. The dry sample is pelletized, ground and sifted at 0.59–0.84 mm.
5. The five IM5 zeolite samples that contain 0, 0.5, 1, 2, 3 and 4% by weight of phosphorus are finally calcined under 100% of water vapor at 750° C. for 5 hours (hydrothermic stage, also called steaming).

Physico-chemical Characteristics of IM-5-P:

The crystallinity that is measured by x-ray diffraction (DRX) and the BET surface of five samples obtained after the five stages as well as the starting sample (fresh) are recorded in the following table:

| IM-5-P Content of P in % | DRX Crystallinity | BET Surface $m^2g^{-1}$ |
|---|---|---|
| 0 fresh | 100% | 352 |
| 0.5 | 95.9% | 285 |
| 1 | 91.0% | 279 |
| 2 | 82.1% | 267 |
| 3 | 77.3% | 262 |
| 4 | 71.2% | 231 |

The DRX spectra of six samples are very similar and present lines that are characteristic of an IM-5 sample that is described in French Patent Application FR-2,754,809. In particular, the samples that contain phosphorus do not exhibit characteristic lines that correspond to the addition of phosphorus.

The BET surfaces show that all of the samples have very good crystallinity that slightly decreases when the phosphorus content increases.

EXAMPLE 2

Preparation of Six Catalysts with and without Phosphorus and Cracking of N-decane The catalysts are prepared by mixing 0.5 g of zeolite with or without phosphorus with 2.5 g of silica $SiO_2$ (BASF D-11-11). This silica previously calcined at 800° C. for 11 hours under air, and its specific surface area is then 97 $m^2/g$.

The six catalysts prepared with the IM-5 zeolites that contain 0, 0.5, 1, 2, 3 and 4% by weight of phosphorus are evaluated in a cracking test of the n-decane at 500° C. in a test microunit (MAT unit). The injection time is 60 seconds.

For each catalyst, three experiments are carried out by varying the injected decane mass (1.54, 0.906 and 0.77 g of n-decane). We recorded in the table below the first-order kinetic constant calculated from the conversion results.

| % of P (ex-$NH_4H_2PO_4$) | $k^{*}10^{-2}(s^{-1})$ |
|---|---|
| 0 | 1.55 |
| 0.5 | 2.22 |
| 1 | 3.65 |
| 2 | 5.4 |
| 3 | 4.33 |
| 4 | 1.85 |

As we see, the best results are obtained for a phosphorus content of between 2 and 3% by weight.

EXAMPLE 3

Vacuum Cracking of Gas Oil

Three catalysts are prepared for comparison in gas-oil cracking. For each of them, the ultrastable Y zeolite (USY)

with a crystalline parameter that is equal to 2.432 nm is used. An amount of additive (matrix and zeolite) (ZSM-5 for comparison, IM-5 without phosphorus and IM-5 with 2% by weight of phosphorus that is prepared according to Example 1) is added such that the ratio by weight of "Y zeolite/additive"=3. The Si/Al ratios of the ZSM-5 and the IM-5-P are respectively equal to 20 and to 12. Then, the catalysts are calcined under 100% of water vapor (steaming) at 750° C. for five hours. The total catalyst mass used is 3 grams for each experiment.

In the table below, we recorded the main characteristics of the gas oil under the vacuum used:

| | |
|---|---|
| Density at 60° C. | 0.916 |
| K-UOP | 11.84 |
| Refraction index at 67° C. | 1.4932 |
| Sulfur (% by weight) | 2.7 |
| Nitrogen (% by weight) | 0.15 |
| Conradson carbon (% by weight) | 0.09 |
| Aniline point (° C.) | 76 |
| Na (ppm) | <0.05 |
| Cu (ppb) | 30 |
| Ni (ppb) | 30 |
| V (ppb) | <25 |
| Fe (ppm) | 0.5 |
| Mean molecular weight | 405 |
| Distillation curve (° C.) | ASTM D1160 |
| 10% | 400 |
| 30% | 411 |
| 50% | 425 |
| 70% | 449 |
| 90% | 489 |

The performance levels of the three catalysts were evaluated in vacuum cracking of gas oil at 520° C. For an injection time of 30 seconds, the injected vacuum gas-oil mass was 4, 3.5, 3, 2.5 and 2 grams while the catalyst mass remains constant and equal to 3.0 grams. The conversion is given as being equal to 100—(% of LCO+% suspension).

The values that are recorded in the table below correspond to yields expressed in % by weight. These are extrapolated values that are obtained for a conversion that is equal to approximately 60%.

| Catalyst | ZSM-5 | IM-5 | IM-5/2%P |
|---|---|---|---|
| Dry gases | 3.8 | 3.1 | 2.1 |
| LPG | 21.9 | 19.1 | 16.8 |
| Gasoline | 29.6 | 33.6 | 34.2 |
| Coke | 6.5 | 6.2 | 4.3 |
| Conversion | 61.8 | 62.0 | 57.4 |
| LCO | 6.9 | 7.2 | 10.5 |
| Suspension | 31.3 | 30.8 | 32.1 |
| C3=/C3 | 1.2 | 1.4 | 2.2 |
| C4=/C4 | 0.4 | 0.5 | 0.8 |

As we see from this table, the addition of phosphorus makes it possible to reduce significantly the output of dry gases ($H_2$, $C_1$ and $C_2$) and coke while the contents of light olefins C3 and C4 are clearly improved.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/06.189, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalytic composition comprising:
   I. at least one IM-5-P phosphorus zeolite comprising silicon and at least one additional framework element selected from the group consisting of Al, Fe, Ga, Ti, and B, and not more than 10% by weight of phosphorus;
   II. at least one Y zeolite having a faujasite structure; and
   III. at least one matrix.

2. A catalytic composition according to claim 1, in which the percentages by weight are as follows:
   0.01 to 97% of I;
   from 0.1 to 60% of II; and
   at least 3% of III.

3. A catalytic composition according to claim 1, in which the percentages by weight are as follows:
   0.05 to 40% of I;
   from 4 to 50% of II; and
   at least 20% of III.

4. A catalytic composition according to claim 1, in which the percentages by weight are as follows:
   0.1 to 20% of I;
   from 10 to 40% of II; and
   at least 40 to 70% of III.

5. A catalytic composition according to claim 1, wherein the phosphorous content of the IM-5-P zeolite is at most equal to 5% by weight.

6. A catalytic composition according to claim 5, wherein the phosphorous content is about 2–3% by weight.

7. A catalytic composition according to claim 1, wherein the IM-5-P zeolite has an Si/Al atomic ratio of at least equal to 5.

8. A catalytic composition according to claim 7, wherein the zeolite has an Si/Al atomic ratio between 20 and 400.

9. A catalytic composition according to claim 1, wherein the IM-P-5 zeolite is at least partially in its hydrogen form.

10. A process of preparing the catalytic composition according to claim 1 comprising mixing III, II and I together.

11. In a process comprising catalytically cracking a hydrocarbon feedstock under cracking conditions, the improvement comprising employing a catalyst comprising a zeolite according to claim 1.

12. A process according to claim 11, wherein said hydrocarbon feedstock comprises decane.

13. A process according to claim 11, wherein the cracking conditions are as follows:
   contact time of between 10 and 60,000 milliseconds;
   ratio by weight of catalyst to feedstock of between 0.5 and 50;
   reaction temperature 400° C. to 800° C.; and
   pressure 0.5 to 10 bar.

14. A process according to claim 13, wherein in the hydrocarbon feedstock contains propane and the contact time is about 10,000 to 60,000 milliseconds thereby producing propylene.

15. In a process comprising catalytically cracking a hydrocarbon feedstock under cracking conditions, the improvement comprising employing a catalyst comprising a zeolite according to claim 6.

16. A process according to claim 15, wherein said hydrocarbon feedstock comprises decane.

17. An IM-5-P phosphorus zeolite comprising silicon and at least one additional framework element selected from the group consisting of Al, Fe, Ga, Ti, and B and about 2–3% by weight of phosphorus.

18. A zeolite according to claim 17, wherein the zeolite has an Si/Al atomic ratio of at least equal to 5.

19. A zeolite according to claim 17, wherein the zeolite has an Si/Al atomic ratio between 20 and 400.

20. A zeolite according to claim 19, wherein the zeolite is at least partially in its hydrogen form.

21. In a process comprising catalytically cracking a hydrocarbon feedstock under cracking conditions, the improvement comprising employing a catalyst comprising a zeolite according to claims 17.

22. In a process comprising catalytically cracking a hydrocarbon feedstock under cracking conditions, the improvement comprising employing a catalyst comprising a zeolite according to claim 20.

* * * * *